(12) United States Patent
Delaney et al.

(10) Patent No.: US 7,088,728 B2
(45) Date of Patent: Aug. 8, 2006

(54) METHODS AND SYSTEMS FOR ROUTING SIGNALONG MESSAGES TO THE SAME DESTINATION OVER DIFFERENT ROUTES USING MESSAGE ORIGINATION INFORMATION ASSOCIATED WITH NON-ADJACENT SIGNALING NODES

(75) Inventors: Robert J. Delaney, Raleigh, NC (US); Todd Eichler, Wake Forest, NC (US)

(73) Assignee: Tekelec, Calabasas, CA (US)

( * ) Notice: Subject to any disclaimer, the term of this patent is extended or adjusted under 35 U.S.C. 154(b) by 118 days.

(21) Appl. No.: 10/345,632

(22) Filed: Jan. 16, 2003

(65) Prior Publication Data
US 2004/0141514 A1    Jul. 22, 2004

(51) Int. Cl.
*H04L 12/28* (2006.01)
(52) U.S. Cl. ............ 370/410; 370/426; 379/221.1
(58) Field of Classification Search ............ 370/410, 370/419, 401, 469, 225, 229, 230, 252, 385, 370/352, 426, 237, 238, 395.31, 465, 351, 370/353, 392, 400, 406, 422; 373/112, 219; 379/229, 230, 220.01, 221.09, 221.1, 221.12, 379/231; 455/446
See application file for complete search history.

(56) References Cited

U.S. PATENT DOCUMENTS

| | | | |
|---|---|---|---|
| 4,752,924 A | | 6/1988 | Darnell et al. |
| 5,008,929 A | | 4/1991 | Olsen et al. |
| 5,384,840 A | | 1/1995 | Blatchford et al. |
| 5,481,673 A | * | 1/1996 | Michelson ............ 709/242 |
| 5,592,477 A | * | 1/1997 | Farris et al. ............ 379/230 |
| 5,592,530 A | * | 1/1997 | Brockman et al. ....... 370/252 |
| 5,708,702 A | | 1/1998 | De Paul et al. |
| 5,898,667 A | * | 4/1999 | Longfield et al. ....... 379/230 |
| 6,175,574 B1 | | 1/2001 | Lewis |
| 6,226,289 B1 | * | 5/2001 | Williams et al. ......... 370/385 |
| 6,282,191 B1 | * | 8/2001 | Cumberton et al. ..... 370/352 |
| 6,327,267 B1 | | 12/2001 | Valentine et al. |
| 6,327,270 B1 | | 12/2001 | Christie et al. |

(Continued)

FOREIGN PATENT DOCUMENTS

EP    0 912 068 A2    4/1999

(Continued)

OTHER PUBLICATIONS

Supplementary European Search Report in European Application No. EP 04 70 2497 (Feb. 13, 2006).

(Continued)

*Primary Examiner*—Phirin Sam
(74) *Attorney, Agent, or Firm*—Jenkins, Wilson, Taylor, & Hunt, P.A.

(57) ABSTRACT

Methods and systems for associating a plurality of different routes with the same destination and for routing signaling messages to the destination based on originating information associated with non-adjacent signaling nodes are disclosed. A routing database in a signal transfer point includes multiple routes to the same destination. The routes are distinguishable from each other in the routing database using message origination information associated with signaling nodes that are not adjacent to the signal transfer point. When a signaling message is received, origination and destination information in the signaling message are used in combination to select among multiple routes to a destination having a network address corresponding to the destination information in the signaling message. The signaling message is then routed over the route selected using the originating information. The selected route may be a high-speed route used to provide a particular quality of service.

33 Claims, 9 Drawing Sheets

U.S. PATENT DOCUMENTS

| | | | |
|---|---|---|---|
| 6,535,746 B1 | 3/2003 | Yu et al. | |
| 6,662,017 B1 | 12/2003 | McCann et al. | |
| 6,757,538 B1 | 6/2004 | Howe | |
| 6,792,100 B1* | 9/2004 | Nekrasovskaia et al. | 379/230 |
| 6,836,477 B1 | 12/2004 | West, Jr. et al. | |
| 6,842,506 B1 | 1/2005 | Bedingfield | |
| 6,940,866 B1* | 9/2005 | Miller et al. | 370/426 |
| 2002/0071543 A1* | 6/2002 | Williams | 379/230 |
| 2002/0131427 A1* | 9/2002 | Niermann | 370/401 |
| 2002/0186702 A1* | 12/2002 | Ramos et al. | 370/410 |
| 2003/0206562 A1* | 11/2003 | Yi | 370/522 |
| 2004/0081206 A1* | 4/2004 | Allison et al. | 370/522 |
| 2004/0114533 A1* | 6/2004 | Angermayr et al. | 370/252 |
| 2004/0137904 A1* | 7/2004 | Gradischnig | 455/446 |

FOREIGN PATENT DOCUMENTS

| | | |
|---|---|---|
| EP | 1 111 940 A1 | 6/2001 |
| WO | WO 97/11563 | 3/1997 |
| WO | WO 99/67928 | 12/1999 |

OTHER PUBLICATIONS

Notification of Transmittal of the International Search Report and the Written Opinion of the International Searching Authority, or the Declaration in International Application No. PCT/US04/00999 (Apr. 6, 2005).

European Search Report in European Application No. EP 04 70 2535 (Apr. 10, 2006).

Supplementary European Search Report in European Application No. EP 04 70 2535 (Mar. 22, 2006).

* cited by examiner

METHODS AND SYSTEMS FOR ROUTING SIGNALONG MESSAGES TO THE SAME DESTINATION OVER DIFFERENT ROUTES USING MESSAGE ORIGINATION INFORMATION ASSOCIATED WITH NON-ADJACENT SIGNALING NODES

TECHNICAL FIELD

The present invention relates to routing signaling messages in a communications network. More particularly, the present invention relates to methods and systems for associating a plurality of different routes with the same destination and for selectively routing the signaling messages to the destination over the different routes based on origination or source information associated with non-adjacent signaling nodes.

BACKGROUND ART

In a signaling system 7 (SS7) network, signal transfer point (STP) nodes are employed to route SS7 signaling messages through the network. Conventional STP routing, as defined in Bellcore/Telecordia standard GR-82-CORE, Issue 5, December 2001, involves SS7 message routing based on a destination point code (DPC) value contained in a message transfer part (MTP) routing label in an SS7 message. Such routing is commonly referred to as MTP routing. A sample SS7 message signaling unit (MSU) 100 is shown in FIG. 1. In FIG. 1, MSU 100 includes an originating point code (OPC) 102 and a DPC 104. In the case of signaling connection control part (SCCP) messages that require global title routing, a global title routing address translation step is required before MTP routing is performed. However, in either case, the DPC contained in the MTP routing label of an SS7 message is used to determine over which SS7 signaling linkset the message should be transmitted.

Signaling links connected to an STP are organized into groups of up to 16. Each group is known as a linkset. Furthermore, all signaling links in a given linkset must terminate at the same adjacent node. In the case of a combined linkset, all signaling links in a given linkset must terminate at the same mated pair of adjacent nodes. STP nodes are typically provisioned to distribute message transmission across all of the links in a linkset for load sharing purposes.

In addition to signaling links and linksets, a routing entity, commonly referred to as a signaling route, is also defined at an STP. A signaling route may include one or more signaling linksets. An STP may maintain a cost value associated with each route, and route availability is affected by received network management information. When multiple routes exist to the same destination, the STP may select the lowest cost route to the destination. Thus, all messages received at an STP that are addressed to a particular DPC will be routed to the destination via the first available, lowest cost route, where overall route selection is based on the DPC specified in the message being routed. Such a routing mechanism ensures that a message will be routed to the appropriate DPC, but there is no way using conventional routing procedures to control the exact path or route taken by the message based upon who is sending the message.

To illustrate conventional MTP routing, a sample SS7 network 200 is presented in FIG. 2. In FIG. 2, signaling network 200 includes a pair of originating end office (EO) nodes 202 and 204, a first STP node 206, a second STP node 208, a third STP node 210, and destination end office 212. Originating end office 202 has an SS7 point code of 244-2-1 and is coupled to STP 206, which has a point code of 1-1-1. Signaling linkset LS3 interconnects end office 202 and STP 206. As such, the point code 244-2-1 is referred to as an adjacent point code (APC) with respect to STP 206. Similarly, originating end office 204 has a point code of 5-2-1 and is coupled to STP 206 via signaling linkset LS4. STP 206 is coupled to adjacent STP 208 via LS1. STP 208 has a point code of 10-10-10. STP 206 is coupled to adjacent STP 210 via LS2. STP 210 has a point code of 248-10-10.

Table 1 shown below illustrates exemplary routing data that may be maintained by STP 206. In Table 1, the exemplary routing table includes a Route DPC field, a LinkSet field, a LinkSet APC field, and a Route Cost field. The information contained in Table 1 is used by routing logic in STP 206 to determine how to direct or route a received message. In the message routing scenario illustrated in FIG. 2, STP 206 receives a first SS7 signaling message M1 from originating EO 202. For purposes of illustration, it is assumed that message M1 is addressed to the DPC 145-2-1, which corresponds to EO 212. Upon receiving message M1, routing logic in STP 206 accesses the routing information contained in Table 1 and selects an outbound signaling linkset associated with the lowest cost route to 145-2-1. In this example, the selected signaling linkset is LS1, which is connected to adjacent STP 208. Consequently, the message is transmitted to STP 208 via linkset LS1. STP 208, upon receiving the message M1, performs similar routing processing and transmits the message across another signaling linkset to destination EO 212.

TABLE 1

Routing Information

| Route DPC | LinkSet | LinkSet APC | Route Cost |
|---|---|---|---|
| 145-2-1 | LS1 | 10-10-10 | 10 |
|  | LS2 | 248-10-10 | 20 |
| 10-10-10 | LS1 | 10-10-10 | 10 |
| 248-10-10 | LS2 | 248-10-10 | 10 |
| 244-2-1 | LS3 | 244-2-1 | 10 |
| 5-2-1 | LS4 | 5-2-1 | 10 |

In the second message routing scenario illustrated in FIG. 2, a message M2 is sent by end office 204. The DPC in the message is set to 145-2-1, which corresponds to EO 212. Message M2 is received by STP 206, which again accesses the routing information contained in Table 1 and selects an outbound signaling linkset corresponding to the lowest cost route to 145-2-1. Once again, the lowest cost route is selected, which corresponds to signaling linkset LS1 (assuming LS1 is not congested or out of service) and the message M2 is transmitted to STP 208 via linkset LS1. STP 208, upon receiving message M2, transmits the message to destination EO 212.

The routing process illustrated above has significant drawbacks in situations where network operators need the ability to control the routing of some or all signaling messages traversing a network. For example, as shown in FIG. 3, a network operator may install a high-speed, highly reliable signaling linkset LS5 that directly connects STP 206 and EO 212. The network operator may desire to charge a premium for signaling traffic that uses LS5 and may enter an agreement with the owner of EO 204 to ensure that all signaling messages originating from EO 204 are routed via the high-speed, reliable linkset LS5. Given the routing mechanisms currently utilized in SS7 signaling networks, there is no means for STP 206 to guarantee that messages from EO 204 will be routed via LS5.

U.S. Pat. No. 5,384,840 discloses a system for routing signaling messages to different destinations using network endpoint STPs (NESTPs) based on the nodes that are immediately adjacent to the NESTPs. However, in large telecommunications networks, the end office that originates a signaling message may not be adjacent to the node that routes the signaling message to the destination. FIG. 4 illustrates this problem. In FIG. 4, an STP 214 is located between end offices 202 and 204 and STP 206. As a result, if STP 206 implements a routing scheme such as that described in the '840 patent that relies on the immediately adjacent node to select an outbound signaling linkset, both signaling messages M1 and M2 will be routed over the same linkset, even though they originated from different end offices. Such a routing scheme is unsuitable for networks in which service providers wish to provision high-speed or high-reliability routes and selectively route messages over the high-speed or high-reliability routes independently of intermediate networks.

Therefore, there exists a long felt need for methods and systems for selecting a route among multiple routes to the same destination so that signaling messages from a particular source can be guaranteed to be transmitted over a particular routing schema independently of the intermediate network.

DISCLOSURE OF THE INVENTION

The present invention may include a signaling network routing node, such as a signaling system 7 signal transfer point or SS7-Internet protocol signaling gateway (SG), for associating a plurality of different routes with the same destination and for selectively routing messages to the destination over the different routes using origination information identifying a non-adjacent source that originated the signaling messages. For SS7 ISDN user part (ISUP) messages, a message routing function associated with the routing node may examine originating point code and destination point code values to select among multiple routes to the DPC based on the OPC. For SS7 signaling connection control part messages, global title translation processing may be performed to determine the intended DPC. The message routing function may examine the OPC stored in the SCCP calling party address in the message to select among multiple routes to the same DPC.

By using origination information associated with a non-adjacent source to make a routing decision among multiple routes to the same DPC, the present invention allows source-based quality of service schemes to be implemented on a per-end-office or per-service-provider basis. For example, a first service provider may establish multiple routes to the same DPC. Some of the routes may be high speed or high QoS routes and other routes may be low speed or low QoS routes. The first service provider may contract with another service provider to provide a high-speed path for signaling messages. In order to ensure that signaling messages originating from the second service provider's end office are sent over the high-speed route, the first service provider may associate, with the high speed route, an OPC corresponding to an end office of the second service provider in the routing tables inside a signal transfer point managed by the first service provider. As a result, messages originating from the OPC of the second service provider can be guaranteed to be sent over the high-speed route, even when the end office is not adjacent to the node making the routing decisions. The fact that the present invention eliminates the adjacency requirement of conventional source-based routing allows quality of service routing to be implemented for a plurality of different service providers or different nodes of the same service provider in a plurality of different geographic locations.

The functions for providing non-adjacent-origination-based routing decisions are described herein as functions or processes. It is understood that these functions or processes may be implemented in software. Alternatively, the modules or processes described herein may be implemented entirely in hardware. In yet another alternate implementation, the modules or processes described herein may be implemented as a combination of hardware and software. Any combination of hardware, software, and/or firmware for performing non-adjacent-origination-based route selection as described herein is intended to be within the scope of the invention.

The processes and functions for providing non-adjacent-origination-based routing decisions are described below as being associated with cards or subsystems within a routing node. It is understood that these cards or subsystems include hardware for storing and executing the processes and modules. For example, each card or subsystems described below may include one or more microprocessors, such as an x86 microprocessor available from Intel Corporation or any of the K series of microprocessors available from AMD Corporation, and associated memory.

Accordingly, it is an object of the present invention to provide methods and systems for associating a plurality of different routes with the same destination and for selectively routing signaling messages over the different routes to the destination using origination information associated with non-adjacent nodes that originate the signaling messages.

It is yet another object of the present invention to provide a routing node that is capable of generating usage measurements and billing data associated with SS7 messages routed over a special route based on origination information associated with the signaling messages.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of preferred embodiments of the present invention will now be explained with reference to the accompanying drawings of which.

DETAILED DESCRIPTION OF THE INVENTION

Figure 5:
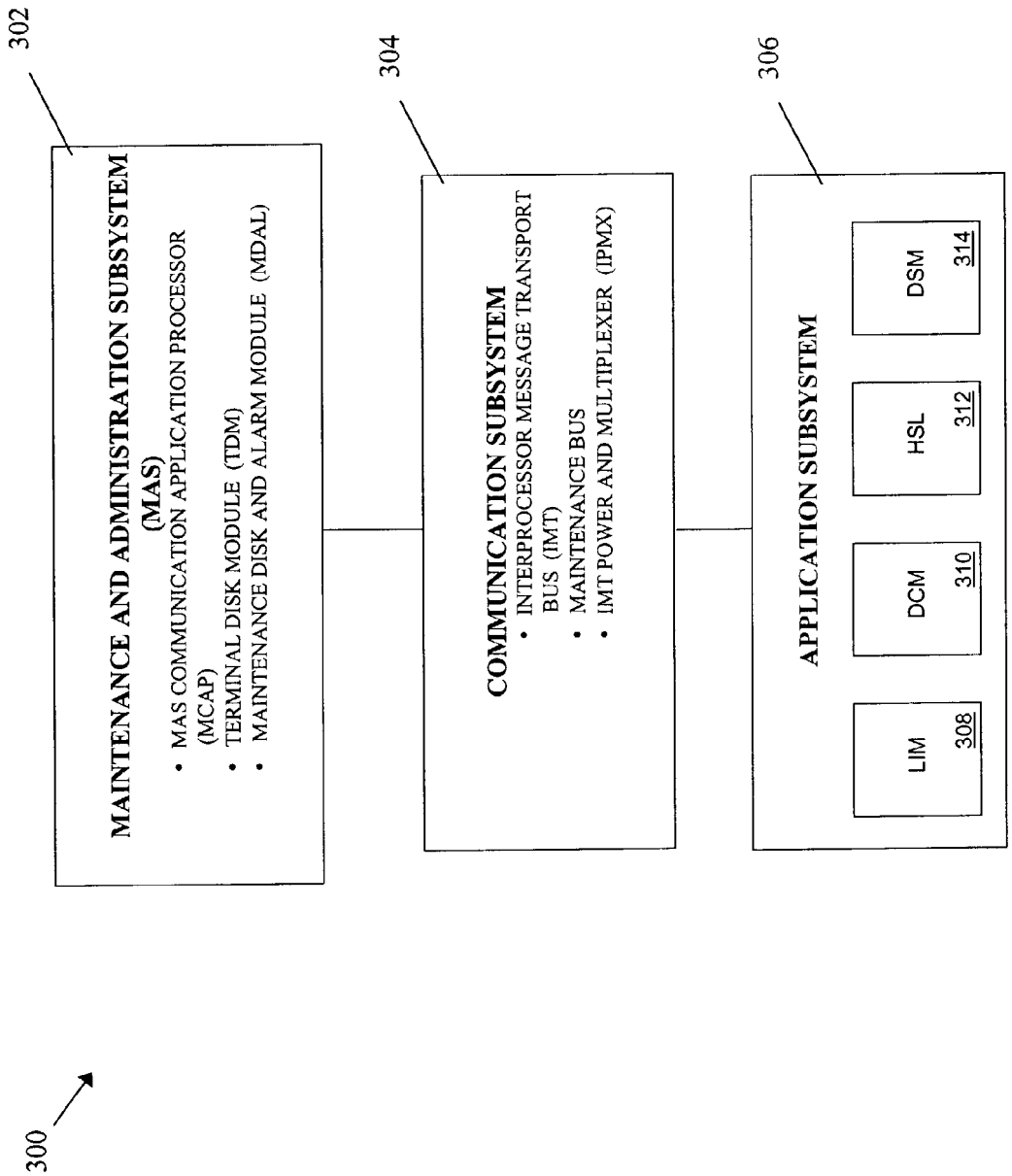
FIG. 5 is a block diagram illustrating an exemplary architecture of a signal transfer point suitable for use with embodiments of the present invention.

Disclosed herein are several embodiments of the present invention, which may include an underlying hardware platform similar to that of a signal transfer point or an SS7/IP gateway. FIG. 5 is a block diagram illustrating an exemplary STP node 300, which employs a distributed, multi-processor system architecture suitable for use with embodiments of the present invention. As shown in FIG. 5, an STP 300 includes the following subsystems: a maintenance and administration subsystem (MAS) 302, a communication subsystem 304 and an application subsystem 306. MAS 302 provides maintenance communications, initial program loading, peripheral services, alarm processing and system disks. Communication subsystem 304 includes an interprocessor message transport (IMT) bus that is the main communication bus among subsystems in STP 300. The IMT bus includes 1 Gbps counter-rotating serial rings.

Application subsystem 306 includes application cards or printed circuit boards capable of communicating with the other cards through the IMT bus. Numerous types of application cards can be included in STP 300. Exemplary application cards include a link interface module (LIM) 308 that provides SS7 links and X.25 links, a data communication module (DCM) 310 that provides an Internet protocol (IP) signaling interface to external nodes, and a high-speed asynchronous transfer mode (ATM) communication link module (HSL) 312. A database service module (DSM) 314 includes database-related applications, such as global title translation and number portability translation applications.

Figure 6:
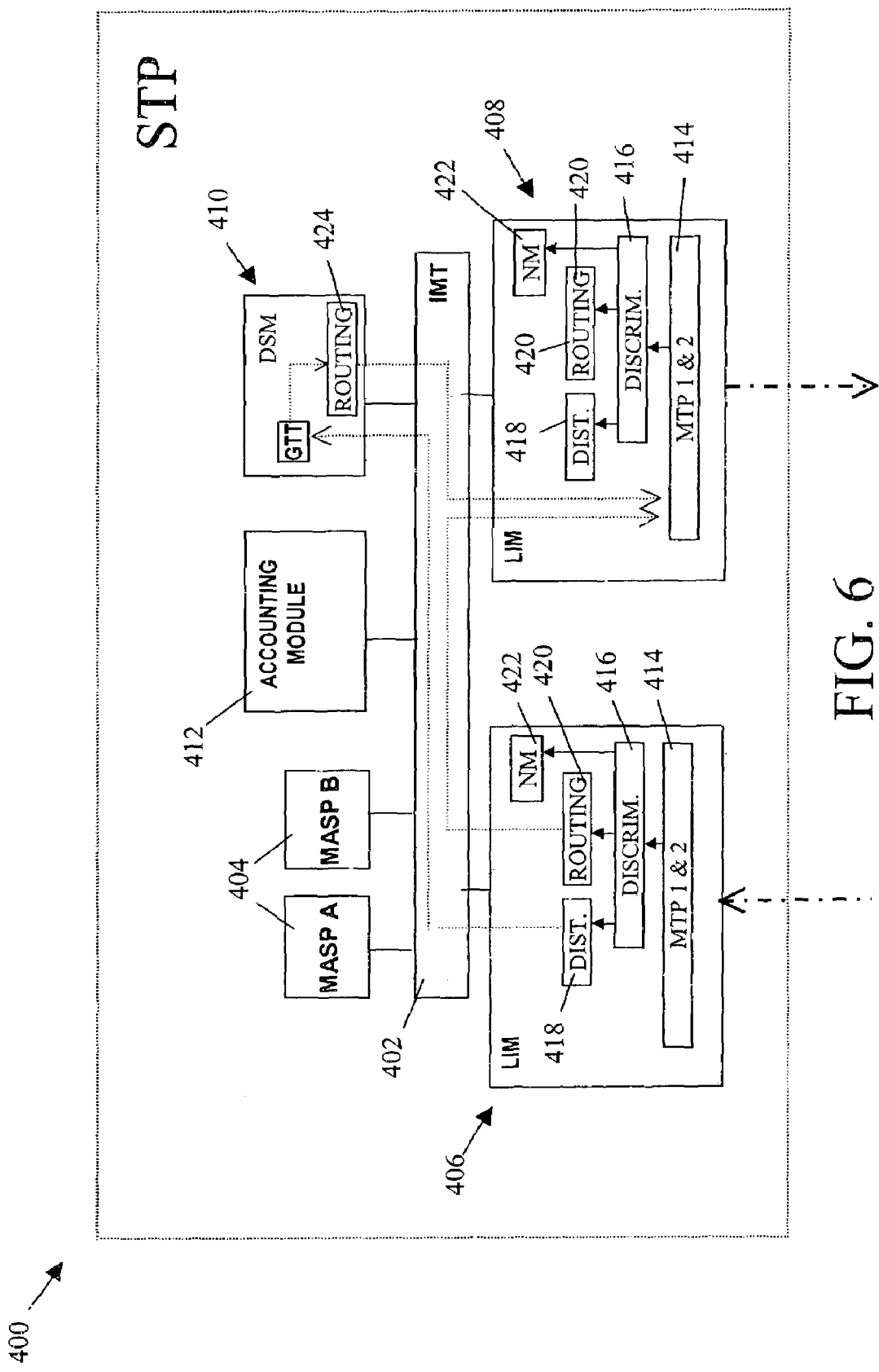
FIG. 6 is a block diagram illustrating an STP for associating a plurality of different routes with the same destination and for selectively routing messages to the destination over the different routes using origination information associated with non-adjacent nodes according to an embodiment of the present invention.

The architecture illustrated in FIG. 5 may be used to implement the methods and systems for associating a plurality of different routes with the same destination and for selectively routing messages among the different routes using origination information associated with non-adjacent nodes according to embodiments of the present invention. FIG. 6 illustrates an STP routing node 400 including a system for associating multiple routes with the same destination and for selectively routing messages among these routes using origination information associated with non-adjacent nodes according to an embodiment of the present invention. In FIG. 6, STP routing node 400 includes a high speed interprocessor message transport (IMT) communications bus 402. A number of distributed processing modules or cards may be coupled to IMT bus 402. In FIG. 6, these processing modules or cards include a pair of maintenance and administration subsystem processors 404, a first SS7 link interface module 406, a second SS7 LIM 408, a database services module 410, and an accounting module 412. These modules may be physically connected to the IMT bus 402 such that signaling and other types of messages may be routed internally between active cards or modules. The distributed, multi-processor architecture of STP routing node 400 facilitates the deployment of multiple LIM, DSM and other cards, all of which may be simultaneously connected to and communicating via IMT bus 402.

MASP pair 404 implement the maintenance and administration subsystem functions described above. As MASP pair 404 are not particularly relevant to a discussion of the flexible routing attributes of the present invention, a detailed discussion of their function is not provided herein.

LIMs 406 and 408 interface with one or more external signaling links. LIMs 406 and 408 may have a number of sub-components. In FIG. 6, these sub-components include an SS7 MTP level 1 & 2 function 414, an SS7 MTP level 3 layer message discrimination function 416, message distribution function 418, a routing function 420, and a signaling network management (NM) function 422.

MTP level 1 and 2 function 414 provides the facilities necessary to send and receive digital data over a particular physical medium, as well as to provide error detection, error correction and sequenced delivery of SS7 messages. Message discrimination function 416 receives signaling messages from the lower processing layers and performs a discrimination function that effectively determines whether an incoming SS7 message requires internal processing or is simply to be through switched. Examples of received SS7 messages that require internal processing include signaling connection control part messages in need of global title translation and signaling network management messages. Another example of a received signaling message includes an SS7 over IP signaling message including an Internet Engineering Task Force (IETF) SS7 adaptation layer.

For SCCP messages that require GTT processing by database services module 410, message distribution function 418 may receive such messages from discrimination function 416 and direct the messages to database services module 410 via IMT bus 402. This type of internal distribution of messages within the STP node should not be confused with message routing, which refers to selecting an external signaling link over which a received message should be forwarded.

Routing function 420 is responsible for examining an incoming message and determining on which outbound linkset and link the message is to be transmitted. One aspect of the present invention is concerned with how routing function 420 selects an outbound linkset and link when multiple links or linksets are available to the same destination. Unlike conventional MTP routing functions that select routes based only in DPC and route cost, routing function 420 may utilize origination or source entity information associated with non-adjacent nodes (e.g., an OPC value, a source IP address, a calling party dialed number, etc.) during route selection process. As such, messages addressed to the same destination point code but sent from different origins may be forwarded over different routes to the same destination independently of the intermediate network between the signaling message origin and STP 400. Once route selection is made, routing function 420 ensures that the message is directed internally to the appropriate communication module (e.g., SS7 LIM, IP DCM, ATM HSL, etc.) for outbound transmission.

MTP level 3 signaling network management function 422 may receive, process, and generate messages associated with the management and administration of an SS7 signaling network. SS7 network management processes within an STP node of the present invention may be cognizant of not only the status of signaling links going to a DPC but also the OPCs that actually have routes via those links to the DPC. As such, NM function 422 may selectively communicate network management information to adjacent signaling points, so as to prevent the unwarranted sending of network management messages to nodes that are not affected by network failures.

As illustrated in FIG. 6, database services module 410 includes a routing function 424. Routing function 424 performs the same routing functions as those described above with respect to routing function 424. When performing route selection for a message that has undergone GT translation processing, routing function 424 may examine message origination information contained in a GT translated message. In one embodiment, routing function 424 may examine an SCCP calling party address parameter of the message if the message has a service indicator of 3, as opposed to message origination information contained in an MTP routing label of the received message. Routing function 424 utilizes the origination or source entity information contained in the GT translated signaling message during the linkset selection process, and, as such, messages that translate to the to the same destination address but that are sent from different origins may take different routes to the destination. Once this determination is made, routing function 424 ensures that the message is directed internally to the appropriate communication module (e.g., SS7 LIM, IP DCM, ATM HSL, etc.) for outbound transmission.

Route Selection and Routing Function Operation

Both communication-module-based routing functions 420 and GTT application-module-based routing function 424 include or have access to a routing database that includes information for routing signaling messages to other nodes in a signaling network. Exemplary data associated with a routing database of the present invention is presented below in Table 2. Unlike conventional routing tables, the routing information contained in Table 2 includes an OPC field associated with each DPC field. The OPC field stores the point code of a signaling point that is not adjacent to STP 400. As will be described in detail below, the OPC values in the OPC field may be used to select among multiple outbound linksets for a particular DPC.

TABLE 2

DPC-OPC Keyed Routing Information

| DPC | OPC | LinkSet | LinkSet APC | Route Cost | Acct |
|---|---|---|---|---|---|
| 145-2-1 | 244-2-1 | LS1 | 10-10-10 | 10 | No |
|  |  | LS2 | 248-10-10 | 20 | No |
|  |  | LS5 | 145-2-1 | 30 | Yes |
| 145-2-1 | 5-2-1 | LS5 | 145-2-1 | 10 | No |
| 10-10-10 | * | LS1 | 10-10-10 | 10 | No |
| 248-10-10 | * | LS2 | 248-10-10 | 10 | No |
| 244-2-1 | * | LS6 | 1-2-1 | 10 | No |
| 5-2-1 | * | LS6 | 1-2-1 | 10 | No |

In addition to the OPC and DPC fields, the routing data accessed by routing functions 420 and 424 may have a number of data fields including a linkset field, an adjacent point code field, a route cost field, and an accounting/billing subsystem field. The linkset field stores linkset identifiers corresponding to each destination point code/originating point code pair. As illustrated in Table 2, some OPC/DPC pairs may have multiple linkset identifiers associated with them. The adjacent point code field stores adjacent point codes for the node collected to the distant end of each signaling linkset identified in the linkset identifier field. The route cost field stores relative route cost values for each linkset. The accounting/billing subsystem field stores an indicator as to whether accounting or billing processing is required for messages routed to a particular linkset.

The routing information accessed by routing functions 420 and 424 may be distributed among multiple data tables or data structures, while still achieving the same routing objectives. For instance, in one embodiment, linkset definition information may be stored in a second data structure, such as that shown below in exemplary Table 3. The sample signaling link data presented in Table 3 include a linkset identifier, one or more signaling link identifiers associated with each linkset, an internal IMT bus address associated with a communication module, a communication port associated with a communication module, and a signaling link status indicator. Once again, the specific implementation or structure of the routing database, illustrated in Tables 2 and 3 is not essential to the present invention. Alternate structures in which linkset selection is based on originating information and a message may be used without departing from the scope of the invention.

TABLE 3

Signaling Link Information

| LinkSet | Link ID | IMT Bus Address | Comm Port | Status |
|---|---|---|---|---|
| LS1 | SL1 | 1410 | A | Avail |
|  | SL2 | 2410 | B | N/A |
|  | SL3 | 3410 | A | Avail |
| LS2 | SL1 | 1412 | B | Avail |
|  | SL2 | 2412 | B | Avail |
| LS5 | SL1 | 4210 | A | Avail |
|  | SL2 | 5210 | B | Avail |
|  | SL3 | 6210 | A | Avail |
| LS6 | SL1 | 1410 | B | N/A |
|  | SL2 | 1412 | A | Avail |

Figure 1:
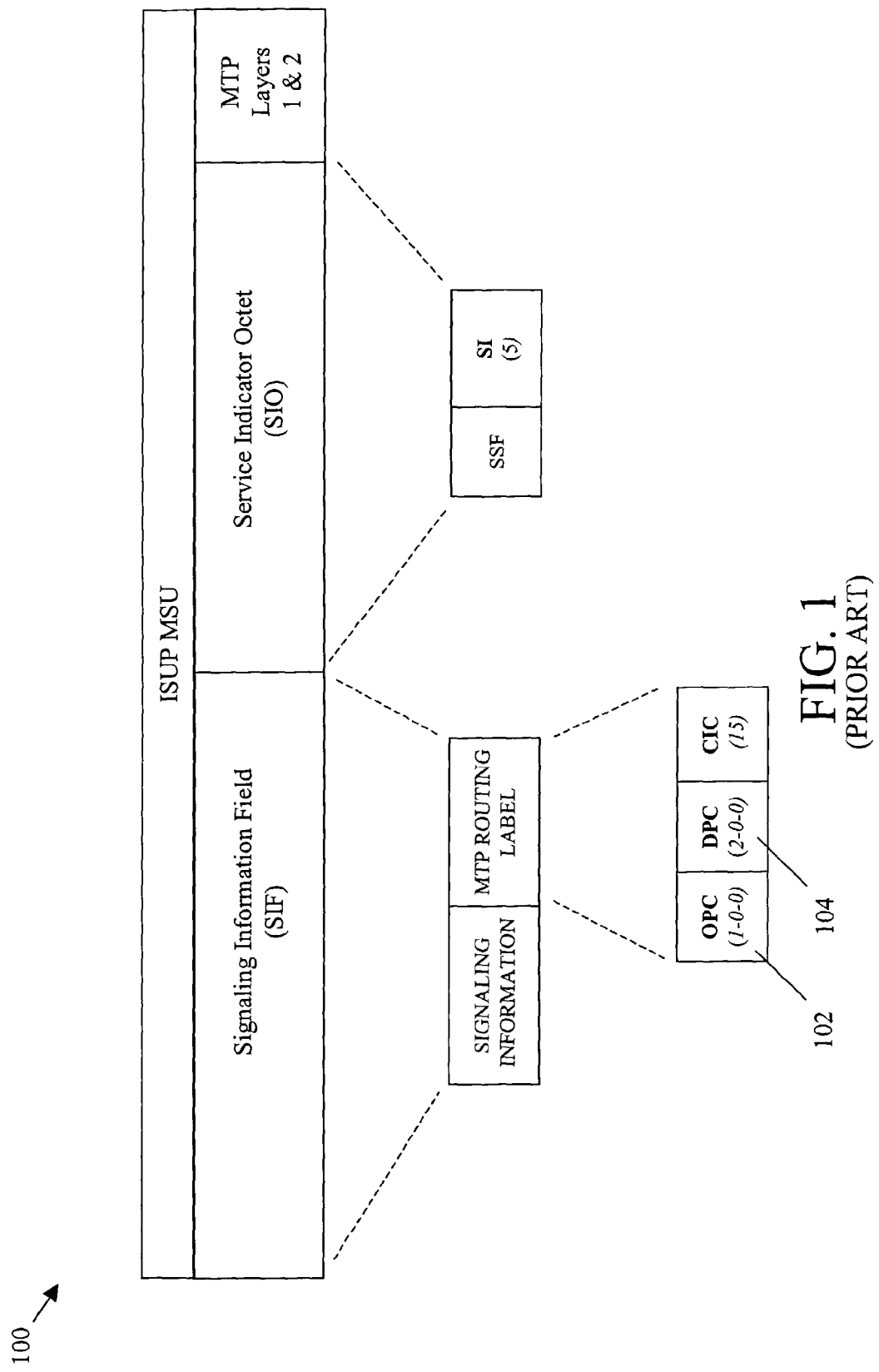
FIG. 1 is a block diagram illustrating exemplary parameters contained within a signaling system 7 (SS7) message signaling unit (MSU)
Figure 2:
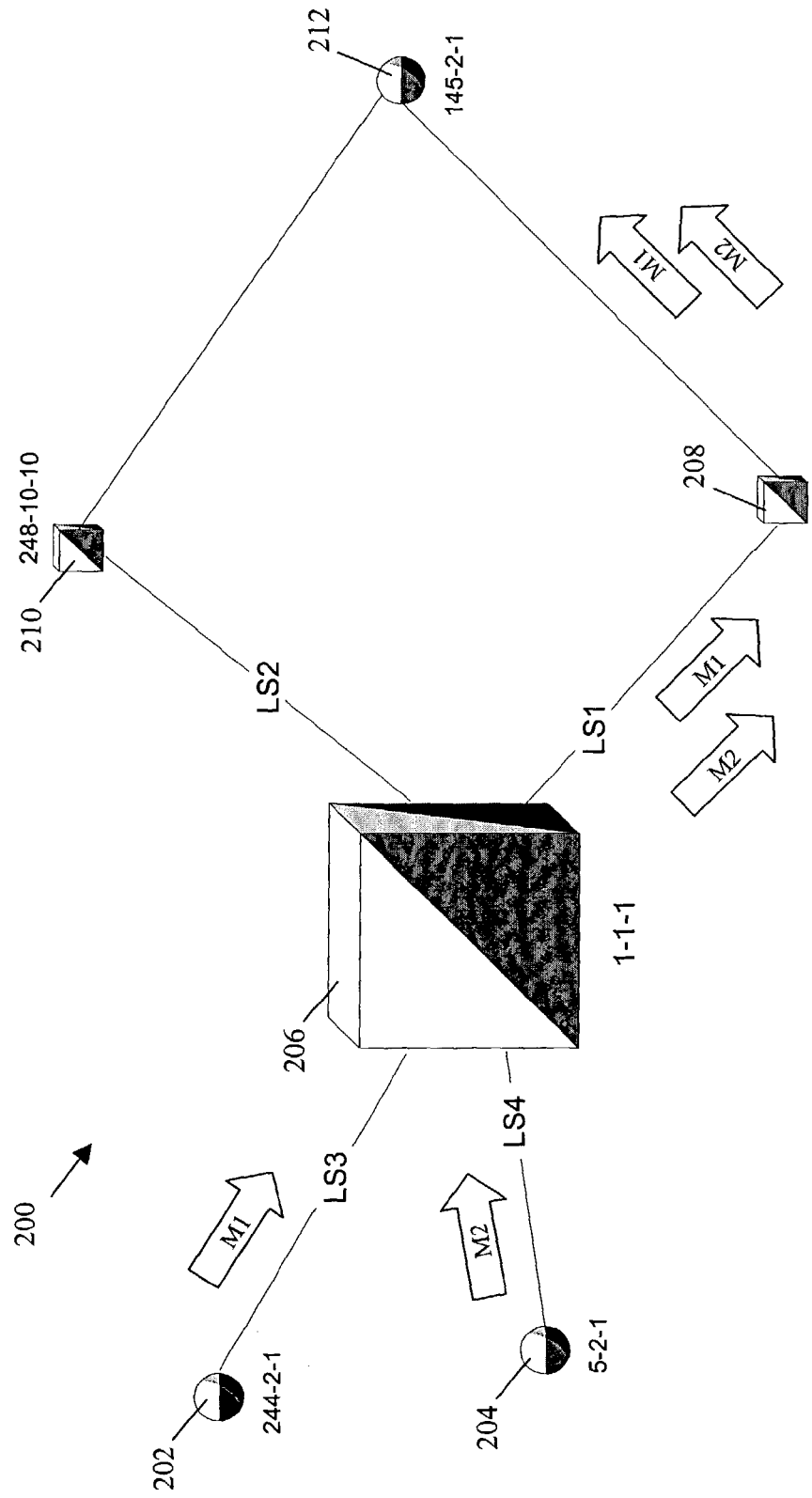
FIG. 2 is a network diagram illustrating a conventional routing strategy employed in SS7 signaling networks.
Figure 3:
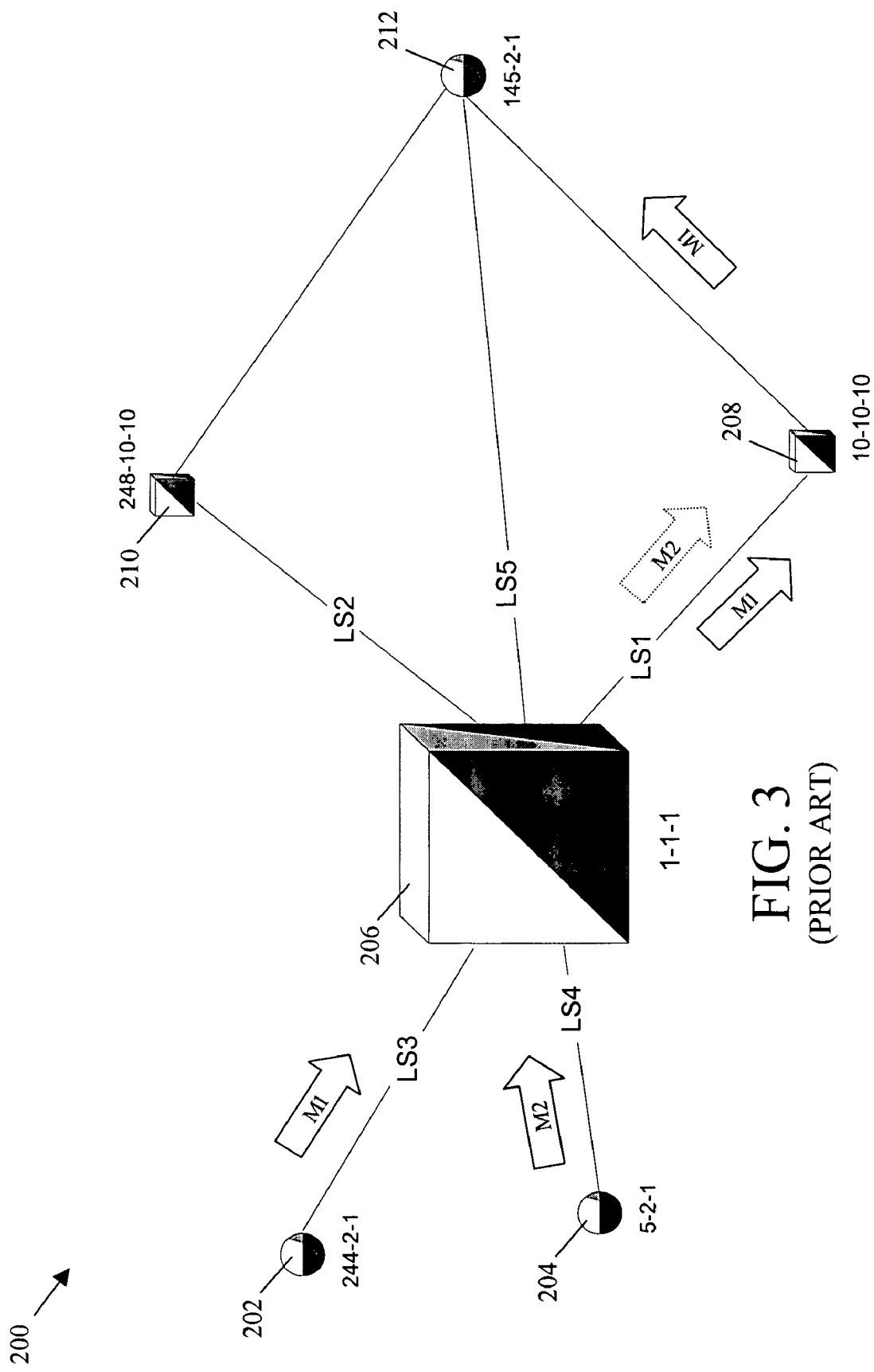
FIG. 3 is a network diagram illustrating a shortcoming of conventional destination-based SS7 message routing techniques.
Figure 4:
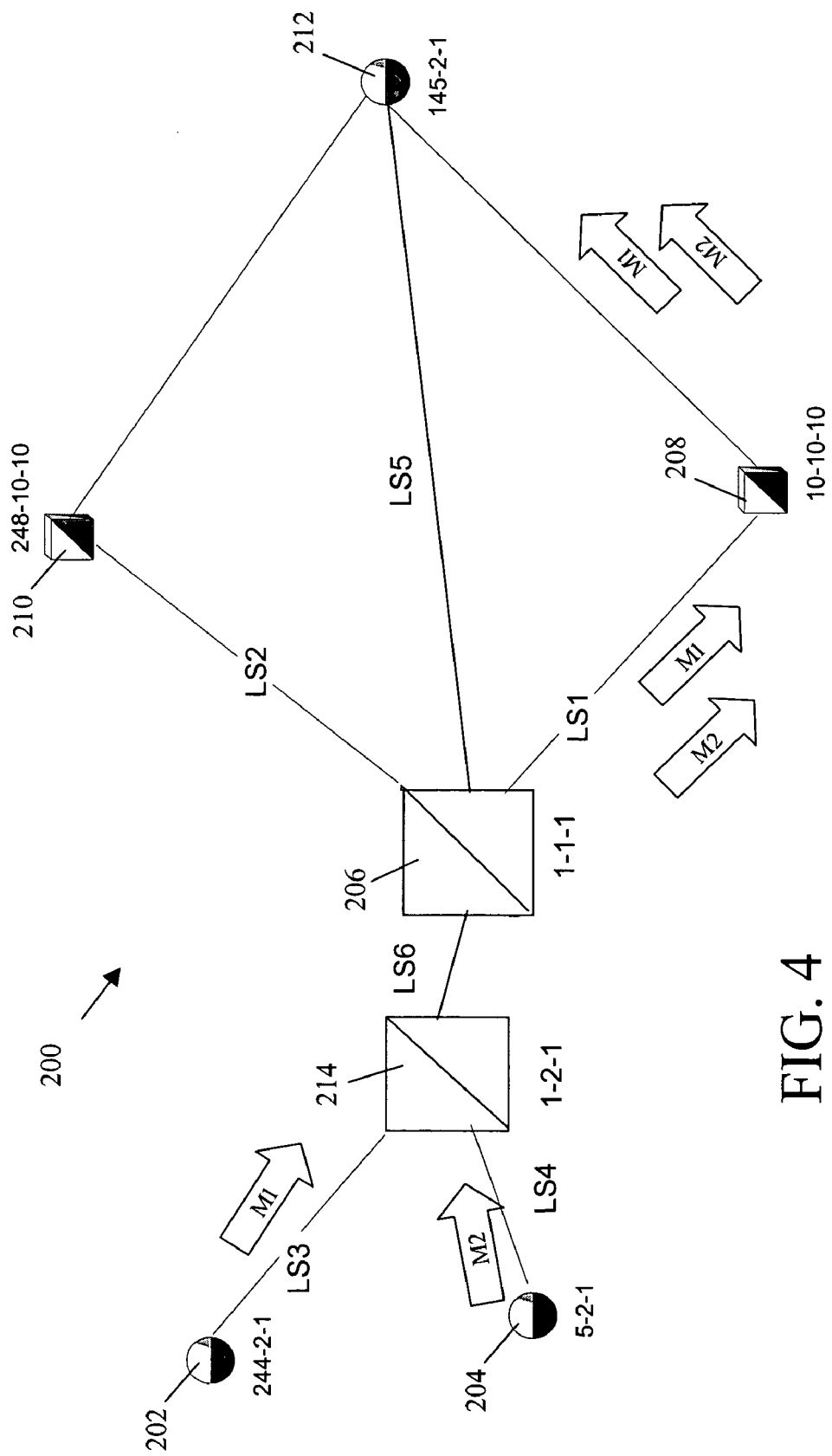
FIG. 4 is a network diagram illustrating a shortcoming associated with conventional adjacent-node-based SS7 message routing.
Figure 7:
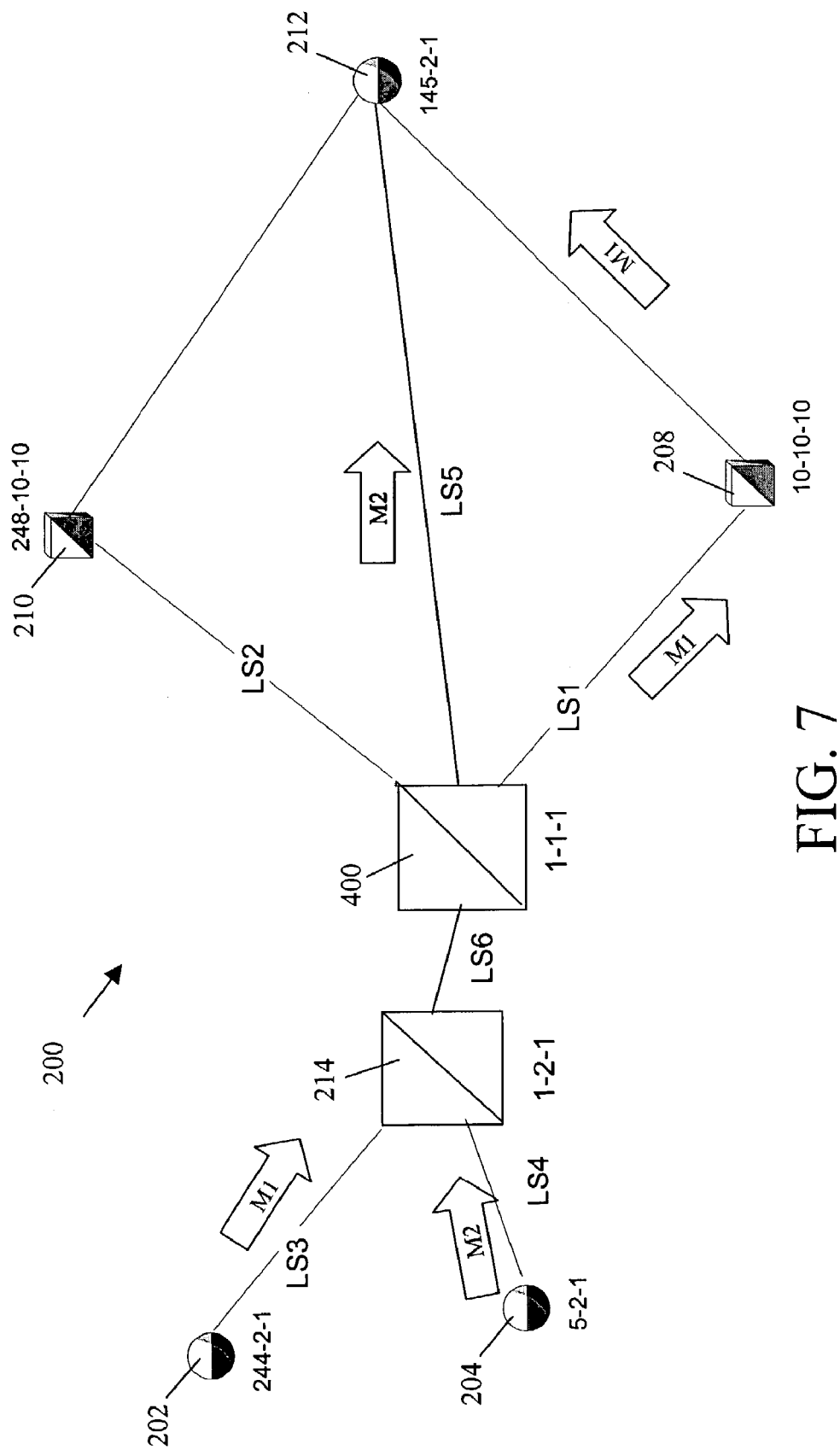
FIG. 7 is a network diagram illustrating a method and a system for associating a plurality of different routes with the same destination and for selectively routing messages to the destination over the different routes based on origination information associated with non-adjacent nodes according to an embodiment of the present invention.

FIG. 7 illustrates a signaling network 200, which includes the same group of network elements and signaling connections as described above with respect to network 200 in FIG. 4, with the exception that conventional STP node 206 has been replaced with STP node 400 of the present invention. In the signaling scenario presented in FIG. 7, non-adjacent signaling point 202 transmits a signaling message M1 over linkset LS3 to STP node 214. The MTP routing label of message M1 includes an OPC parameter value of 244-2-1 and a DPC parameter value of 145-2-1. Signaling point 204 transmits a signaling message M2 over linkset LS4 to STP node 214. Message M2 is assumed to have an OPC value of 5-2-1 and a DPC value of 145-2-1. Given the DPC values specified in the two messages, the messages are both destined for the same network element 212. STP node 214 MTP-routes the messages to STP 400.

In this example, three signaling routes exist between STP node 400 and signaling point 212. One signaling route is defined from STP 400 to SP 212 via LS1 and STP node 208, another signaling route is defined from STP 400 to SP 212 via LS2 and STP node 210, and another signaling route is defined directly from STP 400 to SP 212 via LS5. These signaling routes along with their corresponding signaling linkset and signaling link associations are presented in Tables 2 and 3 above.

When signaling message M1 is received by LIM 406 of STP 400, the message is processed and passed from MTP level 1 & 2 function 414, to discrimination function 416, and to routing function 420. Routing function 420 accesses route and signaling link information similar to that shown in Tables 2 and 3, selects the appropriate route for the signaling message M1 based on the DPC and OPC values contained in the message (i.e., DPC=145-2-1, OPC=244-2-1). The first entry in Table 2 corresponds to the DPC and OPC combination contained in the message M1 and indicates that the primary route for the message is along LS1. Table 3 is next accessed using the selected linkset LS1 as an access key. An available signaling link of the linkset is selected and the message is internally directed to the appropriate outbound communication module and port for transmission via LS1 to SP 212.

In a similar manner, signaling message M2 is received by LIM 406 of STP 400 and the message is passed from MTP level 1 & 2 function 414, to discrimination function 416, and to routing function 420. Routing function 420 accesses route and signaling link information and selects the appropriate route for the signaling message M2 based on the DPC and OPC values contained in the message (i.e., DPC=145-2-1, OPC=5-2-1). The second entry in Table 2 corresponds to the DPC and OPC combination contained in the message M2 and indicates that the primary route for the message is LS5. Table 3 is next accessed using the selected linkset LS5 as an access key. An available signaling link of the linkset is selected and the message is internally directed to the appropriate outbound communication module and port for transmission via LS5 to SP 212. Thus, two messages addressed to the same DPC are routed from STP 400 via completely different signaling paths to their common destination and independently of the fact that the two signaling messages may have been sent to STP 400 via the same intermediate network element. Such message-origination-based routing functionality is extremely useful for operators who, for example, desire to install a high-speed communication linkset in addition to the conventional low-speed linksets, and selectively route all traffic from a particular non-adjacent network or network element over the higher quality, high-speed linkset. In the example illustrated in FIG. 7, if the received signaling message M2 is an SCCP message and message distribution function 418 of LIM 406 determines that the message requires global title translation processing, the message is directed to database services module 410 where GTT processing is performed. Following GTT processing, routing function 424 performs linkset selection similar to that described previously with respect to the LIM-based routing function 420. However, in the case of routing function 424, the message origination information (e.g., the originating point code) may be extracted from the calling party address (CgPA) parameter located within the SCCP portion of the message. This is necessary because during GTT processing, the OPC parameter in the MTP routing label is typically modified, and the original OPC is moved to the SCCP CgPA field. In any event, once the message origination information is determined, linkset selection is similar to that described above.

Figure 8:
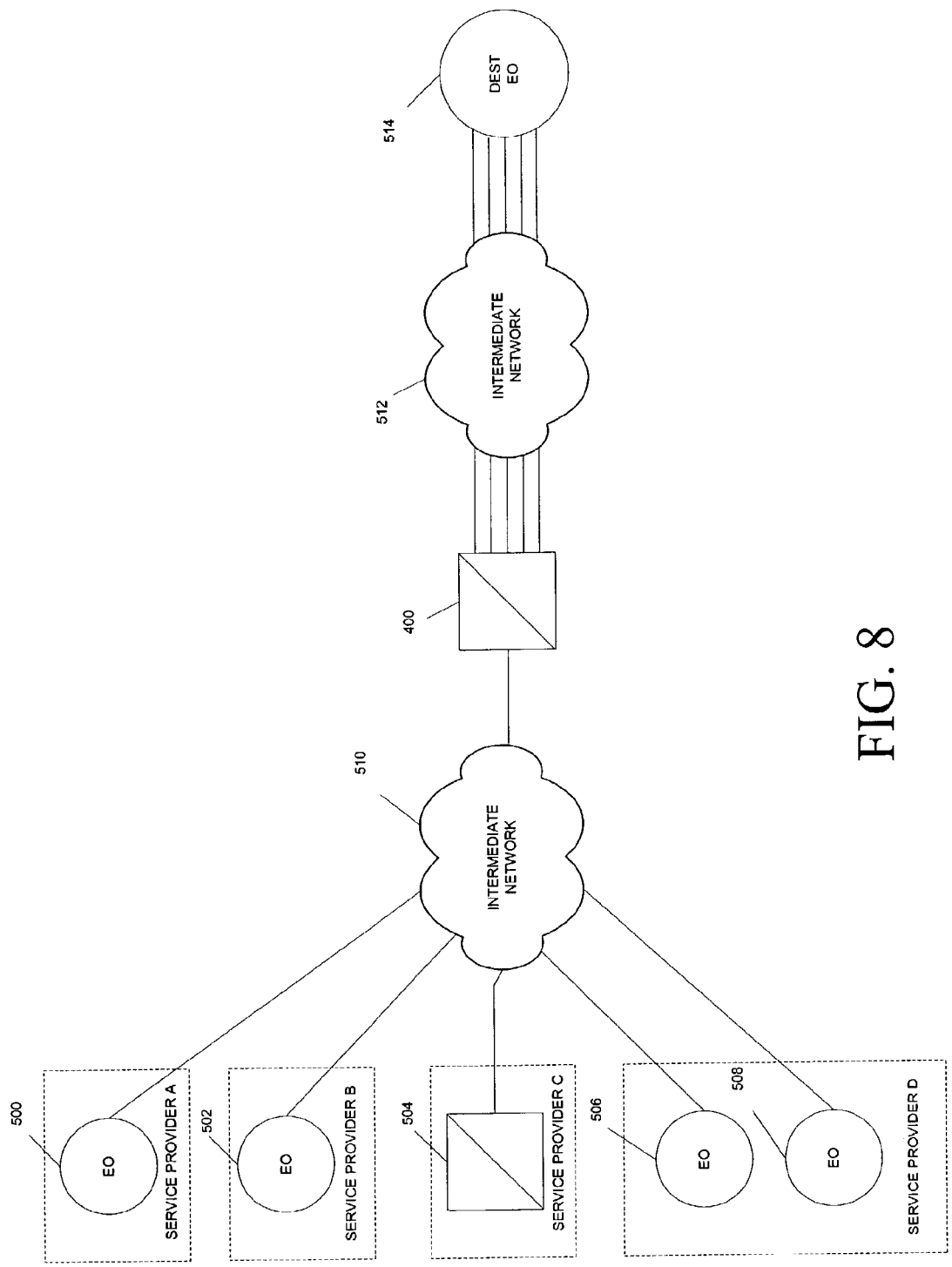
FIG. 8 is a network diagram illustrating a system for providing quality of service for messages originating from a plurality of different sources in a plurality of different locations and independently of an intermediate network according to an embodiment of the present invention.

Removing the adjacency requirement of conventional source routing allows differential quality of service to be provided independently of source node location. This feature of the invention is illustrated in FIG. 8. In FIG. 8, source nodes 500–508 are connected to STP 400 via intermediate network 510. By provisioning the routing tables in STP 400 to route messages based on originating address information as described above, STP 400 may provide differential quality of service routing through network 512 to destination end office 514 independently of the path taken through intermediate network 510. As a result, source nodes 500–508 may be located in different geographic locations and/or in different service provider networks.

Network Management

In SS7 networks, there are three categories of network management: traffic management; link management; and route management. Traffic management is the process of diverting messages away from failed links. Link management involves the activation and deactivation of signaling links. Route management is responsible for both the re-routing of messages around failed SS7 signaling points, and controlling the flow of messages to any given signaling point in the network. Such a network management strategy provides a layered approach to managing failure events in an SS7 network. The SS7 protocol provides procedures designed to minimize the effects of network congestion and outages, from the link level through the route level.

A number of routing management messages are commonly employed to re-direct traffic around a failed or congested route. Such messages may be sent by an SS7 signaling point in response to the failure of one or more provisioned links. More particularly, when a route fails, a routing management message is sent to all neighboring SS7 signaling nodes (i.e., those SS7 signaling nodes that are adjacent to the signaling node that detects the failure). This routing management message informs the neighboring SS7 signaling nodes of the route failure and also provides instructions regarding future routing to the node that detected the failure.

Routing management messages are also used to inform neighboring SS7 signaling nodes of the recovery of a previously failed route. Such SS7 routing management messages include transfer prohibited (TFP) messages, transfer restricted (TFR) messages, transfer controlled (TFC) messages, transfer allowed (TFA) messages, transfer cluster prohibited (TCP) messages; and transfer cluster allowed (TCA) messages. These messages are only a subset of all network management messages defined in the SS7 protocol. A comprehensive discussion of SS7 network management and related issues can be found in Signaling System #7 by Travis Russell, McGraw-Hill Publishing 1998.

A transfer prohibited (TFP) message is generated and transmitted by an SS7 signaling point, such as an STP, in response to determining that communication with an SS7 node is no longer possible. In response to determining that communication with an SS7 node is possible, but suboptimal, a transfer restricted (TFR) message is sent. A TFR message requests that adjacent SS7 signaling points use alternate routes when sending messages to the SS7 node associated with an unavailable route. If alternate routes are not available, messages may continue to be routed normally. A transfer controlled (TFC) message is sent by an SS7 signaling point, such as an STP, in response to the receipt of an MSU that is destined for a congested route. In such a scenario, the MSU may be discarded based on priority and a TFC message is returned to the originator or sender of the MSU. A transfer allowed (TFA) message is sent by an SS7 signaling point when a previously failed route once again becomes available.

According to the present invention, signaling route selection is based in part on the origin of the message being routed. Consequently, when a signaling linkset connected to a particular DPC becomes impaired or unavailable, the appropriate signaling network management messages are preferably only sent to those nodes in the network that have a route to the DPC via the affected linkset. In conventional network management, messages are broadcast to all adjacent nodes in the network that have a route to the affected DPC. In another conventional approach, network management messages are sent to a particular adjacent node in the network that has a route to the affected DPC when that adjacent node attempts to send a message to the affected DPC.

In an OPC-based routing scheme, distributing network management messages to all adjacent nodes that have a route to a particular destination point code is inefficient because routes are defined using the OPC as well as the DPC. If network management messages are sent to all nodes having a particular destination point code without regard to the originating point code, some network management messages would be unnecessarily sent to nodes whose routes are not effected by a particular event.

Figure 9:
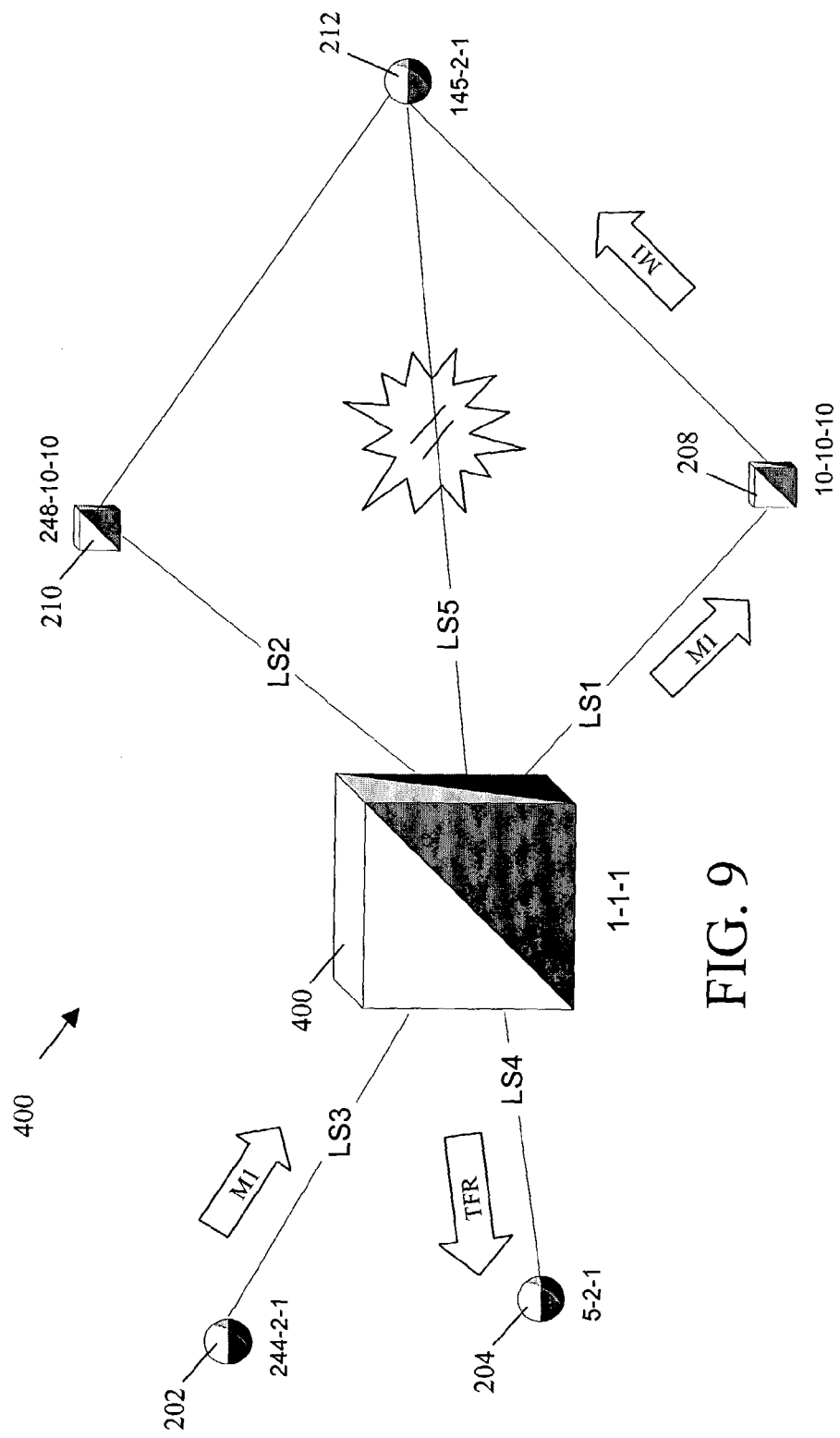
FIG. 9 is a network diagram illustrating a method and a system for performing selective network management for routes associated with origination information according to an embodiment of the present invention.

FIG. 9 is a network diagram illustrating exemplary OPC-based network management procedures according to an embodiment of the present invention. In FIG. 9, it is assumed that signaling linkset LS5 becomes unavailable. When STP node 400 determines that LS5 is unavailable, a response method TFP network management message is generated by STP 400 when a message originated by EO 204 is destined for 212, since LS5 is the only route available. Although signaling point 204 may originate messages with the DPC 145-2-1, node 202 does not receive a TFR/TFP message because 2 out of 3 routes are still available due to the fact that the present invention sends response method network management messages until all routes to a DPC are down. The response method network management message are preferably only sent to nodes having an OPC associated with the route to the DPC in the routing tables of STP 400. When all routes to a DPC are down, STP node 400 will broadcast network management messages. Thus, the present invention selectively sends network management messages based on routes defined by OPC/DPC combinations, unnecessary network management messages are reduced, and node 202 may continue sending messages via linksets LS1 or LS2 to the DPC 145-2-1.

Within STP node 400 shown in FIG. 6, LIM-based network management function 422 may monitor link status and selectively transmit such NM messages. Similar OPC-selective SCCP subsystem management functionality may be incorporated within SCCP application processors, such as module 410. For example, if an SCCP subsystem becomes unavailable, SCCP subsystem management messages may only be sent to nodes having an OPC associated with the particular subsystem. Such MTP and SCCP network management functions prevent the unwarranted sending of network and subsystem management messages to nodes that are not affected by a particular linkset failure.

Accounting Subsystem

In Table 2, LS5 has been provisioned as a higher cost, signaling route for messages from 244-2-1 to 145-2-1. As such, messages sent by SP 202 to SP 212 may be routed over LS5 in the event that LS1 and LS2 become impaired or unavailable. In this case, accounting module 412 in STP 400 may maintain accounting and billing information associated with message traffic traversing LS5.

In one embodiment, LIM-based routing process 420 may generate accounting information associated with a signaling message that is to be routed via LS5. This accounting information may be a copy of some or all of the signaling message, or the accounting information may be a new message that contains information associated with the signaling message. Date and timestamp information may also be included in the accounting message. The accounting information may be communicated via IMT bus 402 to accounting module 412, where it is stored. An example of such accounting information is shown below in Table 4. Table 4 includes message date and time fields, a message OPC field, selected route or linkset identifier field, and a message type field. In one embodiment, the message type may be determined by examining a service indicator value in a received SS7 message. Such accounting information may be used to maintain data or statistics relevant to the number of messages required premium or high-speed routing service. This data may be used to charge other service providers for different classes or qualities of service.

TABLE 4

| Message Accounting Information | | | | |
| --- | --- | --- | --- | --- |
| Date | Time | OPC | LinkSet | Type |
| Oct. 10, 2002 | 11:23:02 | 244-2-1 | LS5 | ISUP |
| Oct. 10, 2002 | 11:43:05 | 244-2-1 | LS5 | SCCP |

Although the embodiment illustrated in FIG. 6 includes an internal accounting module, the present invention is not limited to such an embodiment. For example, in an alternate embodiment, some or all of the functionality of accounting module 412 may be incorporated within an external application server platform, such as a TekServer application server platform available from Tekelec of Calabasas, Calif.

Thus, as described above, the present invention includes methods and systems for selectively routing signaling messages using origination information and independently of source node location. The origination information may be used to select a high speed/more reliable route for messages originating from a service provider location where the service provider pays additional money for the high speed/more reliable route. In addition, network management procedures may be selectively performed based on combination of origination and destination information, rather than using destination information only as in conventional network management. Furthermore, billing functions can be performed based on originating and destination information in messages so that messages utilizing high speed/more reliable routes can be identified and the service provider can be appropriately billed for using the high speed/more reliable route.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network routing node for routing a signaling message via one of a plurality of different routes to the same destination based on origination information associated with the signaling message and independently of source node location, the network node comprising:

(a) a signaling link interface module for receiving a signaling message originating from a signaling node that is not adjacent to the network routing node;

(b) a routing database associated with the signaling link interface module, the routing database including a plurality of different routes to the destination identified by destination information in the signaling message, the routes being distinguishable from each other in the routing database using origination information associated with a plurality of non-adjacent signaling nodes; and (c) a routing function associated with the routing database for using origination information associated with the signaling message to select one of the plurality of signaling routes for routing the signaling message to the destination identified by the destination information based on the non-adjacent node origination information in the routing database.

2. The network node of claim 1 wherein the signaling link interface module comprises a signaling system 7 (SS7) signaling link interface module.

3. The network node of claim 1 wherein the signaling link interface module comprises an SS7-over-Internet protocol (IP) signaling link interface module.

4. The network node of claim 1 wherein the signaling message comprises an SS7 message signaling unit.

5. The network node of claim 1 wherein the signaling message comprises an SS7 over IP signaling message including an Internet Engineering Task Force (IETF) SS7 adaptation layer.

6. The network node of claim 1 wherein each of the routes to the destination in the routing database are identifiable by a combination of an SS7 originating point code and an SS7 destination point code.

7. The network node of claim 6 wherein the routing function is adapted to extract an originating point code from a message transfer part (MTP) routing label of the signaling message and to compare the originating point code to originating point codes in the routing database.

8. The network node of claim 6 wherein the routing function is adapted to extract an originating point code from a signaling connection control part (SCCP) calling party address parameter in the signaling message and to compare originating point code to originating point codes in the routing database.

9. The network routing node of claim 1 wherein each of the routes to the destination in the routing database is identifiable by a combination of a source and a destination IP address.

10. The network node of claim 1 wherein the routing function is adapted to route the signaling message to the selected destination without converting the origination or destination information in the signaling message.

11. The network node of claim 1 wherein the selected route comprises a high-speed route to the destination.

12. The network node of claim 11 comprising an accounting module coupled to the signaling link interface module for recording accounting information for messages sent over the high-speed route.

13. The network routing node of claim 1 wherein the signaling link interface module, the routing function, and the routing database are components of an SS7 signal transfer point (STP).

14. A method for selecting among signaling routes to the same destination, the method comprising:

(a) maintaining a routing database in a network routing node;

(b) provisioning, in the routing database, a plurality of different routes to the a destination;

(c) in the routing database, separately identifying the routes to the destination using origination information identifying nodes that are not adjacent to the routing node;

(d) receiving a signaling message originating from one of the nodes, the signaling message including origination information identifying one of the nodes and destination information;

(e) using the destination information in combination with the origination information to select one of the routes to the destination in the routing database; and (f) transmitting the message to the destination using the selected signaling route.

15. The method of claim 14 wherein provisioning a plurality of routes to the same destination includes provisioning a plurality of routes to the same destination point code.

16. The method of claim 15 wherein separately identifying the routes to the destination using message origination information includes separately identifying the routes using originating point codes.

17. The method of claim 14 wherein receiving a signaling message includes receiving a signaling system 7 (SS7) signaling message.

18. The method of claim 14 wherein receiving a signaling message includes receiving an SS7 over IP signaling message including Internet Engineering Task Force (IETF) SS7 adaptation layer.

19. The method of claim 16 wherein using the destination information in combination with the origination information to select a route includes selecting a route from the routing database using a combination of an originating point code and a destination point code extracted from the signaling message.

20. The method of claim 14 wherein each of the routes to the destination in the routing database is identifiable by a combination of a source IP address and a destination IP address and wherein using the destination information in combination with the origination information to select a route includes selecting a route from the routing database using a combination of a source and a destination IP address extracted from the signaling message.

21. The method of claim 19 wherein using an originating point code extracted from the signaling message includes using an originating point code extracted from a message transfer part (MTP) routing label of the signaling message.

22. The method of claim 19 wherein using an originating point code extracted from the signaling message includes using an originating point code extracted from an SCCP calling party address of the signaling message.

23. The method of claim 14 wherein using the destination information in combination with the origination information to select one of the routes to the destination includes selecting the route without converting the origination or destination information in the signaling message.

24. The method of claim 14 wherein using the destination information in combination with the origination information includes selecting a high-speed route from a group of routes including high- and low-speed routes based on the origination information.

25. The method of claim 24 comprising generating an accounting record for each message sent over the high-speed route.

26. A method for selectively distributing network management messages to adjacent network nodes, the method comprising:
 (a) associating a destination point code with a plurality of different routes to the same destination in a network routing database;
 (b) in the routing database, separately identifying the routes to the same destination in the routing database using message origination information;
 (c) detecting network management events associated with the destination point code; and
 (d) generating network management messages in response to the events and sending the network management messages only to nodes having network addresses corresponding to the message origination information in the routing database.

27. The method of claim 26 wherein detecting network management events includes detecting signaling link failures.

28. The method of claim 26 wherein detecting network management events includes detecting signaling linkset failures.

29. The method of claim 26 wherein generating the network management messages comprises generating SS7 message transfer part (MTP) network management messages.

30. The method of claim 26 wherein generating the network management messages includes generating signaling connection control part (SCCP) subsystem management messages.

31. The method of claim 26 wherein steps (a)–(d) are performed at an SS7 signal transfer point (STP).

32. A method for providing differential quality of service routing using a plurality of different routes to the same destination based on source node identification information, the method comprising:
 (a) connecting a plurality of source nodes to a signal transfer point via an intermediate network, each source node having a network address;
 (b) connecting a destination to the signal transfer point via a plurality of different routes, each route providing a different quality of service;
 (c) provisioning a database in the signal transfer point to differentiate among the routes to the destination using the network addresses of the source nodes;
 (d) at the signal transfer point, receiving signaling messages from the source nodes, the signaling messages having originating addresses corresponding to the network addresses of the source nodes; and
 (e) using the originating address in each signaling message to select one of the routes for routing the signaling messages to the destination, thereby providing differential quality of service based on the source node and independently of the intermediate network.

33. The method of claim 14 wherein using the destination information in combination with the origination information includes selecting a high quality of service route from a group of routes including high quality of service routes and low quality of service routes based on the origination information.

* * * * *

UNITED STATES PATENT AND TRADEMARK OFFICE
CERTIFICATE OF CORRECTION

| | | |
|---|---|---|
| PATENT NO. | : 7,088,728 B2 | Page 1 of 1 |
| APPLICATION NO. | : 10/345632 | |
| DATED | : August 8, 2006 | |
| INVENTOR(S) | : Delaney et al. | |

It is certified that error appears in the above-identified patent and that said Letters Patent is hereby corrected as shown below:

On title page, item 54 Title
 replace "SIGNALONG"
 with --SIGNALING--.

Col. 1, line 2
 replace "SIGNALONG"
 with --SIGNALING--

Signed and Sealed this

Twenty-sixth Day of December, 2006

JON W. DUDAS
*Director of the United States Patent and Trademark Office*